Feb. 8, 1938.   R. J. SIMONS   2,107,769
PAINTER'S APPARATUS
Filed Dec. 30, 1936
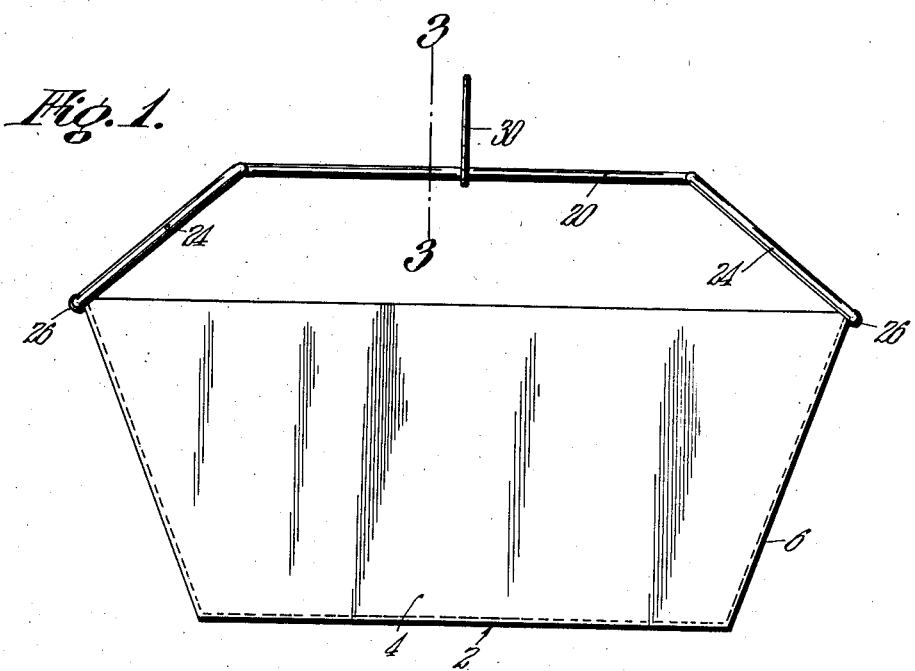
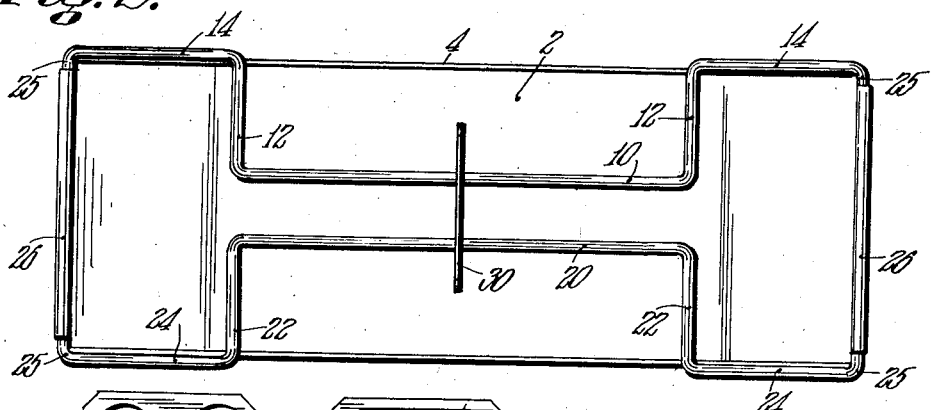
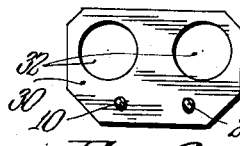
INVENTOR.
Robert J. Simons.
BY
Walter C. Ross.
ATTORNEY.

Patented Feb. 8, 1938

2,107,769

UNITED STATES PATENT OFFICE 2,107,769

PAINTER'S APPARATUS

Robert J. Simons, Springfield, Mass.

Application December 30, 1936, Serial No. 118,215

5 Claims. (Cl. 91—63)

This invention relates to improvements in painters' apparatus and is directed more particularly to the provision of a novel receptacle in which painters' brushes may be removably retained.

It is one of the principal objects of the invention to provide a receptacle having means associated therewith whereby brushes may be removably and conveniently held in such a way that their bristles extend into a quantity of oil or other material so as to prevent the brushes from becoming hard or otherwise damaged. Not only is the device of the invention relatively simple in form so as to be economical to manufacture but its construction is such as it may be conveniently carried from place to place with the brushes therein.

It is another principal object of the invention to provide a receptacle having novel brush-holding means associated therewith which permits the ready insertion and removal of brushes. The device is composed of but a few pieces and is preferably arranged so that the brush-holding means and receptacle are substantially rectangular.

Various other objects and advantages of the invention will become more apparent after a reading of the following description and reference will be had to the accompanying drawing wherein:

Fig. 1 is a side elevational view of the apparatus of the invention;

Fig. 2 is a plan view of the apparatus shown in Fig. 1;

Fig. 3 is a sectional view on the line 3—3 of Fig. 1; and

Fig. 4 is a view similar to Fig. 3 but showing a modified form of construction.

Referring now to the drawing more in detail, the invention will be fully described.

The receptacle part of the apparatus of this invention may take various shapes and forms but it is preferably formed of sheet metal. It includes a bottom wall 2 and side and end walls 4 and 6 extending upwardly therefrom.

The usual form of the receptacle will be more or less rectangular and elongated in shape, but I have found it desirable, for reasons which I will later set forth, that the end walls 6 diverge as shown so that the area of the bottom wall is less than that of the open upper side. Preferably the side walls 4 extend vertically and in parallelism.

The brush-holding means also may be variously formed but in any event it includes a pair of spaced longitudinal members 10 and 20 which extend over the open side of the receptacle in a substantially horizontal position and in the same plane.

It is desirable that the ends of the rod members 10 and 20 terminate short of the end walls 6 in order that ready access to the receptacle is not interfered with at the opposite ends thereof. Accordingly, I provide connecting parts 12 which extend outwardly in the same direction from opposite ends of rod 10 and parts 22 which extend outwardly in the opposite direction from opposite ends of rod 20.

Then parts 14 extend from the outer ends of parts 12 so as to be secured to one side of the receptacle while parts 24 incline downwardly from the outer ends of parts 22 to be secured to the opposite side of the receptacle. Preferably the parts 10, 12 and 14 are formed of a single rod-like wire bent intermediate its ends, as are the parts 20, 22 and 24.

It will be seen that the longitudinal members 10 and 20 are spaced above the walls of the receptacle and co-operate to provide an open-ended slot over the central part of the open side of the receptacle. Thus the brushes may be inserted in the slot at either end thereof with the handles of the brushes supported by the rods 10 and 20.

While the slot-forming members 10 and 20 may be secured to the receptacle proper in various ways, according to the preferred form of the invention, there are turned-in end parts 25 extending from each part 14 and 24 which are secured in some way to the end walls 6. The securing may be accomplished by slipping the said parts 25 under turned over lip parts 26 provided on, and preferably integral with, the upper marginal edges of walls 6.

However, it is desired to point out that the parts 14 and 24 could be secured directly, as by welding or otherwise, to either the side walls 4 or the end walls. In another way, the parts 10, 12, 14, 20, 22, 24 and 25 could be formed from a single length of wire so that the parts 25 at one end of the device would be integral.

What may be called a handle member 30 is provided and this preferably is formed of a relatively thin and flat piece of rigid material, such as sheet metal. This member 30 is arranged to hold the rods 10 and 20 in spaced relation, as well as to provide means for carrying the device, and according to one form of the invention, the plate is provided with a couple of openings through which the longitudinal members 10 and 20 extend. In another way, of course, the plate 30 could be welded directly to the rods.

There may be finger openings 42 in the handle, as shown in Fig. 3, to facilitate grasping thereof so that the apparatus can be carried from place to place. Also, it will be appreciated, it is desirable that the plate be of greater length than the space between the rods 10 and 12 for the reason that after the brushes have been inserted in the slot they extend upwardly above the rods, and it is therefore desirable that the manual-engaging means be located at either side of the slot.

In Fig. 4, there is shown a modified form of handle. Here a plate 40, similar to the plate 30, is provided with an elongated slot 42 and the handle functions in the same way as the other above-described.

In the preferred form of the invention, the brush-holding means is formed of spring-like wire and in assembling the apparatus the rods 10 and 20 are slid through the handle member. Then by sliding the plate 30 towards one or the other end of the rods, pressure on the opposite ends thereof is released so that the parts 25 may be snapped into place. Afterwards the plate may be moved towards the opposite ends of the rods and the other parts 25 put in place.

Finally, the plate may be moved to a substantially central position and there welded, if desired.

It will be appreciated that with the arrangement above described, the bristle ends of the brushes may be readily inserted into the opposite ends of the receptacle and moved down into the slot, at either end thereof, so as to be supported by the rods with the bristles resting in a quantity of linseed oil or the like contained in the receptacle. It should be pointed out, too, that one advantage of the particular formation of recetacle shown is that a less amount of oil is required, due to the relatively small area of the bottom of the receptacle, than would be necessary were the can a true rectangle.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. Painters' apparatus of the class described comprising in combination, a receptacle having a bottom wall and side and end wall members and an open upper side, a pair of spaced-apart substantially horizontal rod members extending over said open upper side of the receptacle above the plane of the upper marginal edges of said wall members in spaced relation, and means securing said rod members to the receptacle including lip members on opposite wall members of the receptacle and extensions on opposite ends of said rod members disposed under and held in place by said lip members.

2. Painters' apparatus of the class described comprising in combination, a receptacle having a bottom wall and side and end wall members and an open upper side, a pair of spaced-apart substantially horizontal rod members extending over said open upper side of the receptacle above the plane of the upper marginal edges of said wall members in spaced relation, means securing said rod members to the receptacle, and a handle member provided with a pair of spaced openings through which said rod members extend whereby the latter are held in spaced relation.

3. Painters' apparatus of the class described comprising in combination, a receptacle having a bottom wall and side and end wall members and an open upper side, a pair of unitary rod members of wire bent intermediate their opposite ends so that each has a substantially horizontal part extending over said open upper side of the receptacle above the plane of the upper marginal edges of said wall members and opposite end parts secured to opposite wall members of the receptacle and connections between said horizontal part and end parts, and a handle member provided with a pair of spaced openings through which said horizontal parts extend whereby the latter are held in spaced relation.

4. Painters' apparatus of the class described comprising in combination, a rectangular receptacle having an open upper side, and a pair of separate unitary wire members bent intermediate their ends to have spaced horizontal parts extending over said open upper side of the receptacle in parallelism with the side walls thereof and end parts in parallelism with the end walls thereof and connections between the horizontal parts and the end parts, said end parts being secured to said end walls.

5. Painters' apparatus of the class described comprising in combination, a rectangular receptacle including a bottom wall and side and end walls extending upwardly therefrom, said end walls being in upwardly diverging relation, a pair of spaced horizontal rod parts extending over the upper side of the receptacle in substantial parallelism with the side walls thereof, end rod parts secured to the receptacle adjacent the opposite ends thereof, and connections between the said horizontal and end parts.

ROBERT J. SIMONS.